US010621974B2

(12) United States Patent
Miki et al.

(10) Patent No.: US 10,621,974 B2
(45) Date of Patent: *Apr. 14, 2020

(54) UPDATING A VOICE TEMPLATE

(71) Applicant: International Business Machines Corporation, Armonk, NY (US)

(72) Inventors: Yukari Miki, Yamamoto (JP); Masami Noguchi, Urasoe (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 14/287,771

(22) Filed: May 27, 2014

(65) Prior Publication Data

US 2014/0278414 A1 Sep. 18, 2014

Related U.S. Application Data

(63) Continuation of application No. 12/606,206, filed on Oct. 27, 2009, now Pat. No. 8,775,178.

(30) Foreign Application Priority Data

Oct. 27, 2008 (JP) .................................. 2008-275807

(51) Int. Cl.
*G10L 15/06* (2013.01)
*G10L 17/04* (2013.01)

(52) U.S. Cl.
CPC ............ *G10L 15/063* (2013.01); *G10L 17/04* (2013.01); *G10L 2015/0635* (2013.01)

(58) Field of Classification Search
CPC ....... G10L 17/00; G10L 15/265; G10L 15/02; G06F 21/32; H04M 2201/41
(Continued)

(56) References Cited

U.S. PATENT DOCUMENTS 5,465,290 A * 11/1995 Hampton et al. .......... 379/88.02
6,480,825 B1    11/2002 Sharma et al.
(Continued)

FOREIGN PATENT DOCUMENTS

JP    2000284798 A    10/2000
JP    2001509285 A    7/2001
(Continued)

OTHER PUBLICATIONS

U.S. Appl. No. 12/606,206, Non-Final Office Action, dated Dec. 31, 2012, 13 pg.
(Continued)

*Primary Examiner* — Richemond Dorvil
*Assistant Examiner* — Mark Villena
(74) *Attorney, Agent, or Firm* — Cuenot, Forsythe & Kim, LLC

(57) ABSTRACT

Updating a voice template for recognizing a speaker on the basis of a voice uttered by the speaker is disclosed. Stored voice templates indicate distinctive characteristics of utterances from speakers. Distinctive characteristics are extracted for a specific speaker based on a voice message utterance received from that speaker. The distinctive characteristics are compared to the characteristics indicated by the stored voice templates to selected a template that matches within a predetermined threshold. The selected template is updated on the basis of the extracted characteristics.

12 Claims, 8 Drawing Sheets

(58) Field of Classification Search
USPC .................. 704/244, 246; 713/176; 705/26.1
See application file for complete search history.

(56) References Cited

U.S. PATENT DOCUMENTS

| | | | |
|---|---|---|---|
| 6,853,716 B1* | 2/2005 | Shaffer | H04M 3/56 |
| | | | 370/260 |
| 7,561,680 B1* | 7/2009 | Falcone | H04M 3/53333 |
| | | | 379/114.05 |
| 7,630,905 B1* | 12/2009 | Reese | H04M 3/5158 |
| | | | 379/265.01 |
| 8,000,269 B1* | 8/2011 | Rae | H04M 3/38 |
| | | | 370/269 |
| 8,234,494 B1* | 7/2012 | Bansal et al. | 713/176 |
| 8,775,178 B2 | 7/2014 | Miki et al. | |
| 2002/0161657 A1* | 10/2002 | Kojac et al. | 705/26 |
| 2003/0009333 A1 | 1/2003 | Sharma et al. | |
| 2003/0182119 A1* | 9/2003 | Junqua et al. | 704/246 |
| 2003/0233231 A1* | 12/2003 | Fellenstein | G10L 17/22 |
| | | | 704/246 |
| 2004/0010698 A1 | 1/2004 | Rolfe | |
| 2004/0029564 A1* | 2/2004 | Hodge | H04M 1/67 |
| | | | 455/411 |
| 2005/0018660 A1* | 1/2005 | Hayashi | H04L 29/06027 |
| | | | 370/352 |
| 2005/0069095 A1* | 3/2005 | Fellenstein | H04M 3/533 |
| | | | 379/88.02 |
| 2005/0125226 A1 | 6/2005 | Magee | |
| 2005/0180547 A1 | 8/2005 | Pascovici | |
| 2006/0085189 A1 | 4/2006 | Dalrymple et al. | |
| 2006/0190264 A1 | 8/2006 | Jaramillo et al. | |
| 2007/0036289 A1 | 2/2007 | Fu et al. | |
| 2007/0041517 A1* | 2/2007 | Clarke | H04M 1/67 |
| | | | 379/67.1 |
| 2007/0071206 A1* | 3/2007 | Gainsboro | H04M 3/2281 |
| | | | 379/168 |
| 2007/0219801 A1 | 9/2007 | Sundaram et al. | |
| 2007/0225984 A1 | 9/2007 | Milstein et al. | |
| 2008/0010066 A1 | 1/2008 | Broman et al. | |
| 2008/0082332 A1 | 4/2008 | Mallett et al. | |
| 2008/0133235 A1* | 6/2008 | Simoneau | G10L 15/197 |
| | | | 704/243 |
| 2008/0154609 A1 | 6/2008 | Wasserblat et al. | |
| 2009/0094029 A1 | 4/2009 | Koch et al. | |
| 2009/0210229 A1* | 8/2009 | Amento | G06F 17/30746 |
| | | | 704/251 |
| 2010/0106501 A1 | 4/2010 | Miki et al. | |
| 2010/0106502 A1 | 4/2010 | Farrell et al. | |
| 2010/0106503 A1 | 4/2010 | Farrell et al. | |
| 2010/0281254 A1* | 11/2010 | Carro | H04L 63/0428 |
| | | | 713/162 |

FOREIGN PATENT DOCUMENTS

| | | |
|---|---|---|
| JP | 2005227758 A | 8/2005 |
| JP | 2006215499 A | 8/2006 |
| JP | 2006215651 A | 8/2006 |
| JP | 2007249179 A | 9/2007 |
| JP | 2008250089 A | 10/2008 |
| JP | 2010102254 A | 5/2010 |
| JP | 5042194 B2 | 10/2012 |

OTHER PUBLICATIONS

U.S. Appl. No. 12/606,206, Final Office Action, dated Aug. 7, 2013, 16 pg.
U.S. Appl. No. 12/606,206, Notice of Allowance, dated Feb. 26, 2014, 13 pg.
U.S. Appl. No. 12/606,206, Examiner's Amendment, dated Apr. 17, 2014, 3 pg.

* cited by examiner

FIG. 3

| BOX# | MESSAGE | TRANSFER REQUEST | WAIT TIME | USER# | OPENED/UNOPENED STATUS |
|---|---|---|---|---|---|
| 1 | Today's meeting has been postponed to tomorrow. | YES | 120 | U1 | CLOSE |
| ... | ... | ... | ... | ... | ... |

FIG. 4

| USER# | BOX# | NAME | TEMPLATE |
|---|---|---|---|
| U1 | 31 | ... | T1 |
| U2 | 32 | B | T2 |
| U3 | 33 | ... | T3 |
| ... | ... | ... | ... |
| temp | | | |

FIG. 5

| EXTENSION NUMBER | BOX# |
|---|---|
| 23 | 12, 32, 48 |
| ... | ... |

FIG. 6

| KEYWORD | BOX# |
|---|---|
| XXX PROJECT | 12, 32, 48 |
| SALES SECTION 1 | 1, 5, 9, 24 |
| ... | ... |

UPDATING A VOICE TEMPLATE

CROSS-REFERENCE TO RELATED APPLICATIONS

This application is a Continuation of U.S. application Ser. No. 12/606,206, filed on Oct. 27, 2009, and claims priority to JP 2008-275807, filed on Oct. 27, 2008.

BACKGROUND

The present invention relates to apparatuses and methods for updating voice templates. In particular, the present invention relates to an apparatus and a method for updating a voice template to recognize a speaker on the basis of the speaker's voice.

A voice template may contain reference data for recognizing a speaker. A voice template may be created by using parameters such as cepstral coefficients in an acoustic vector sequence obtained by performing acoustic analysis on speech signals output from a speaker. A voice template can be registered, for example, when a user who is a speaker starts using a system. If the user's speaking style subsequently changes, the speaker recognition rate may decrease. Reregistration of the voice template would impose additional work on the user.

BRIEF SUMMARY

An embodiment of the present invention provides a method, apparatus, and computer program product that updates a voice template for recognizing a speaker on the basis of a voice uttered by the speaker. It may include a storage unit that stores a plurality of voice templates each of which indicates distinctive characteristics uttered by a corresponding one of a plurality of speakers, a characteristics extraction unit that extracts distinctive characteristics uttered by a specific speaker on the basis of a voice message uttered by the specific speaker, a selection unit that selects, from the plurality of voice templates stored in the storage unit, a specific voice template indicating first distinctive characteristics, degree of similarity between the first distinctive characteristics and the distinctive characteristics extracted by the characteristics extraction unit being equal to or more than a predetermined level, and an update unit that updates the specific voice template selected by the selection unit on the basis of the distinctive characteristics extracted by the characteristics extraction unit.

The method, apparatus, and computer program product in an embodiment may further include an identification unit that identifies an addressee of the voice message uttered by the specific speaker, and a determination unit that determines a plurality of candidate templates that are candidates for the specific voice template on the basis of histories of exchange of voice messages of the addressee identified by the identification unit. The selection unit may select the specific voice template from the plurality of candidate templates determined by the determination unit. In this case, the determination unit may determine, as being the plurality of candidate templates, a plurality of voice templates each of which indicates distinctive characteristics uttered by a corresponding one of a plurality of speakers with which the addressee has exchanged voice messages before.

The method, apparatus, and computer program product in an embodiment may further include a voice recognition unit that performs voice recognition on the voice message uttered by the specific speaker, a keyword extraction unit that extracts a keyword from specific data obtained as a result of the voice recognition by the voice recognition unit, and a determination unit that determines a plurality of candidate templates that are candidates for the specific voice template on the basis of the keyword extracted by the keyword extraction unit. The selection unit may select the specific voice template from the plurality of candidate templates determined by the determination unit. In this case, the determination unit may determine, as being the plurality of candidate templates, a plurality of voice templates each of which indicates distinctive characteristics uttered by a corresponding one of a plurality of speakers predetermined as being related to the keyword extracted by the keyword extraction unit.

Moreover, in an embodiment, the voice message uttered by the specific speaker may be exchanged between the specific speaker and a speaker other than the specific speaker via a telephone line, and the characteristics extraction unit may extract the distinctive characteristics uttered by the specific speaker on the basis of the voice message obtained from a specific telephone line.

The method, apparatus, and computer program product in an embodiment may further include an authentication unit that authenticates the specific speaker using the specific voice template when causing the specific speaker to hear a voice message uttered by a speaker other than the specific speaker.

BRIEF DESCRIPTION OF SEVERAL VIEWS OF THE DRAWINGS

FIG. 3 is a view showing an example of message information used in an embodiment of the present invention.

FIG. 4 is a view showing an example of template information used in an embodiment of the present invention.

FIG. 5 is a view showing an example of history information used in an embodiment of the present invention.

FIG. 6 is a view showing an example of keyword information used in an embodiment of the present invention.

DETAILED DESCRIPTION

Embodiments for carrying out the present invention will now be described in detail with reference to the attached drawings. In an embodiment, when a voice message (hereinafter simply called a message) registered in a message box has been unopened for a predetermined time, an agent other than the addressee of the voice message confirms the voice message. In an embodiment, a voice template (hereinafter simply called a template) used in the system to authenticate an agent is automatically updated.

Figure 1:
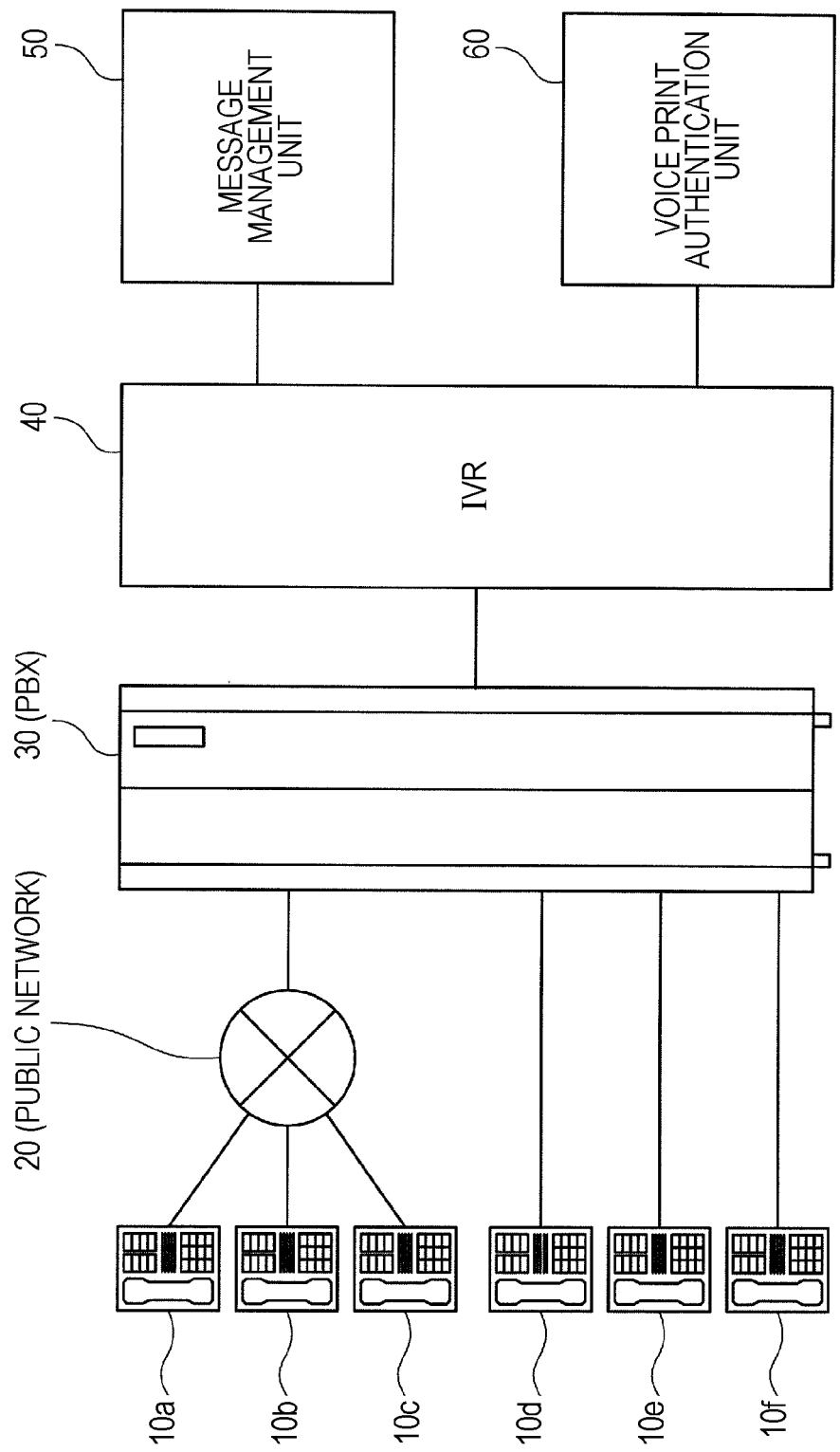
FIG. 1 is a diagram showing the overall configuration of a computer system according to an embodiment of the present invention.

FIG. 1 is a diagram showing an exemplary overall configuration of a computer system according to an embodiment of the present invention. The computer system includes telephones 10a to 10f, a public network 20, a Private Branch eXchange (PBX) 30, an Interactive Voice Response (IVR) 40, a message management unit 50, and a voice print authentication unit 60, as shown in the drawing.

The telephones 10a to 10f each include a transmitter that converts the vibrations of air caused by a voice to electrical signals and sends the electrical signals to a communication partner's telephone and a receiver that converts electrical signals received from a communication partner's telephone to vibrations of air. The telephones 10a to 10f are units that enable a conversation between distant places. As shown in FIG. 1, the telephones 10a to 10c are external telephones connected to the PBX 30 via the public network 20. The telephones 10d to 10f are extension telephones connected to the PBX 30 via an extension line. In FIG. 1, only six telephones 10 are shown. Alternatively, more or fewer telephones 10 may be provided. Moreover, the telephones 10a to 10f may be fixed telephones or cellular phones. Moreover, hereinafter, in a case where the telephones 10a to 10f are not distinguished from each other, the telephones 10a to 10f may be simply called telephones 10.

The public network 20 is a general telephone network.

The PBX 30 is a private branch exchange. That is, in, for example, an enterprise, the PBX 30 establishes connections with the extension telephones 10d to 10f and with the public network 20. The PBX 30 further outputs, to the IVR 40, voices input from the telephones 10 as messages that include digitized voice data.

The IVR 40 is an automatic voice response unit. That is, when a caller operates one of the telephones 10, the IVR 40 accepts the content of the operation and automatically outputs a predetermined voice response corresponding to the operation. Moreover, when a caller inputs a message from one of the telephones 10, the IVR 40 accepts the message.

The message management unit 50 registers messages input from the telephones 10 in message boxes and manages the messages. The message management unit 50 reads and outputs the managed messages to play back the messages on the telephones 10.

When each of the messages managed by the message management unit 50 is played back on one of the telephones 10, the voice print authentication unit 60 performs authentication to determine whether the listener of the message on the telephone 10 is valid, using the voice print of the listener.

In the computer system having such a configuration, in the embodiment, when a message has been unopened for a predetermined time since the message was registered in a message box, an agent is caused to open and confirm the message. Moreover, when the agent confirms the message, authentication of the agent is performed for security. In particular, accurate speaker determination is achieved by automatically updating a template used in the authentication.

The functional components of the IVR 40, the message management unit 50, and the voice print authentication unit 60 for implementing such operations will now be described.

Figure 2:
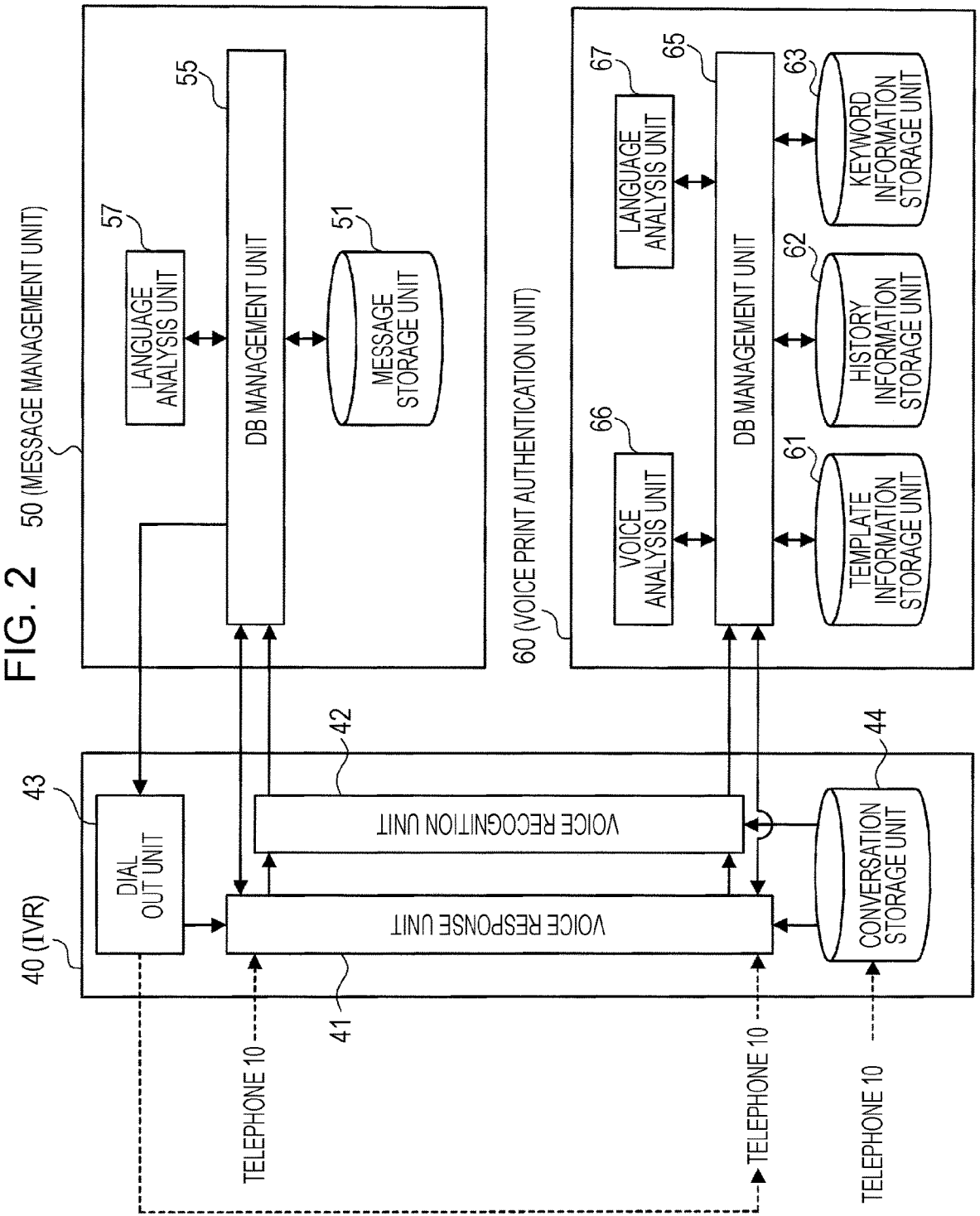
FIG. 2 is a block diagram showing exemplary functional components of an IVR, a message management unit, and a voice print authentication unit according to an embodiment of the present invention.

FIG. 2 is a block diagram showing exemplary functional components of the IVR 40, the message management unit 50, and the voice print authentication unit 60.

The functional components of the IVR 40 will first be described.

The IVR 40 includes a voice response unit 41, a voice recognition unit 42, a dial out unit 43, and a conversation storage unit 44, as shown in the drawing.

The voice response unit 41 accepts, for example, information on dial operations in the telephones 10 and messages from the PBX 30 and returns a response by a machine voice. The voice response unit 41 outputs the accepted information to, for example, the message management unit 50 and the voice print authentication unit 60 and outputs the accepted messages to the voice recognition unit 42. The voice response unit 41 further reads conversation data for each line from the conversation storage unit 44. In an embodiment, the voice response unit 41 is provided as an exemplary identification unit that identifies the addressee of a voice message.

The voice recognition unit 42 recognizes messages input from the voice response unit 41 and converts the messages to data in real time. In an embodiment, the voice recognition unit 42 is provided as an exemplary voice recognition unit that performs voice recognition for voice messages.

The dial out unit 43 sends dial information to the PBX 30 and indicates to the PBX 30 to call a specified telephone number.

The conversation storage unit 44 obtains the voice data of a conversation (hereinafter called conversation data) exchanged between two parties via a telephone line from the PBX 30 and stores the voice data for each line. For example, when a user A talks with a user B over the telephone, the conversation storage unit 44 stores the conversation data of the user A in association with the line ID of a line on which the user A made a call and stores the conversation data of the user B in association with the line ID of a line on which the user B made a call. In this case, a line ID is identification information for uniquely identifying a line.

The functional components of the message management unit 50 will next be described.

The message management unit 50 includes a message storage unit 51, a database (DB) management unit 55, and a language analysis unit 57, as shown in the drawing.

The message storage unit 51 stores message information in which a message box, a message input from the IVR 40, an agent to be requested to confirm the message, and the like are in association with each other.

The DB management unit 55 manages the message storage unit 51. For example, the DB management unit 55 stores a message input from the IVR 40 in the message storage unit 51 and reads an unopened message to cause an agent to confirm the message. The DB management unit 55 further determines an agent to be requested to confirm a message. In an embodiment, the DB management unit 55 is provided as an exemplary determination unit that determines a user preset for a sender and a keyword as being an agent.

The language analysis unit 57 determines the speaker and subject of a message by analyzing data obtained as the result of voice recognition by the voice recognition unit 42 in the IVR 40. In an embodiment, the language analysis unit 57 is provided as an exemplary identification unit that identifies the sender of an electronic message and an exemplary extraction unit that extracts a keyword representing the subject of an electronic message from the electronic message.

The functional components of the voice print authentication unit 60 will next be described.

The voice print authentication unit 60 includes a template information storage unit 61, a history information storage unit 62, a keyword information storage unit 63, a database (DB) management unit 65, a voice analysis unit 66, and a language analysis unit 67, as shown in the drawing.

The template information storage unit 61 stores template information in which, for example, a user ID, a box ID, a user name, and a template to be used in voice print authentication are in association with each other. In an embodiment, the template information storage unit 61 is provided as an exemplary storage unit that stores a plurality of voice templates.

The history information storage unit 62 stores history information in which each extension number is in association with the box ID of a message box to which a message has been sent from the extension number before.

The keyword information storage unit 63 stores keyword information in which each keyword is in association with the box ID of a message box of a user, a conversation related to the keyword being expected to be carried out in the message box.

The DB management unit 65 manages the template information storage unit 61, the history information storage unit 62, and the keyword information storage unit 63. For example, the DB management unit 65 reads a template, referring to the template information storage unit 61 on the basis of information for identifying an agent input from the IVR 40. The DB management unit 65 further determines box IDs to be searched by, for example, searching the history information storage unit 62 on the basis of an extension number corresponding to a line ID input from the IVR 40 or searching the keyword information storage unit 63 on the basis of a keyword obtained by analysis of the result of voice recognition by the language analysis unit 67. Then, the DB management unit 65 searches templates corresponding to the box IDs in the template information storage unit 61 for a template to be updated. In an embodiment, the DB management unit 65 is provided as an exemplary selection unit that selects a specific voice template, an exemplary update unit that updates a specific voice template, an exemplary determination unit that determines a plurality of candidate templates that are candidates for a specific voice template, and an exemplary authentication unit that authenticates a specific speaker using a specific voice template.

The voice analysis unit 66 analyzes the distinctive characteristics recognized by the voice recognition unit 42 in the IVR 40. In an embodiment, the voice analysis unit 66 is provided as an exemplary characteristics extraction unit that extracts the distinctive characteristics uttered by a specific speaker.

The language analysis unit 67 extracts a keyword by analyzing data obtained as the result of voice recognition by the voice recognition unit 42 in the IVR 40. In an embodiment, the language analysis unit 67 is provided as an exemplary keyword extraction unit that extracts a keyword.

FIG. 3 is a view showing an example of message information stored in the message storage unit 51.

As shown in FIG. 3, message information can include a box ID, a message, the presence or absence of a transfer request, wait time, a user ID, and opened/unopened status in association with each other.

A box ID is identification information for uniquely identifying a message box and indicated by "BOX #" in the drawing. Moreover, "YES" is set as the presence or absence of a transfer request. This means that confirmation by an agent is requested. When confirmation by an agent is not requested, "NO" is set. Moreover, time until an agent is requested to confirm a message when the message is unopened is set as "wait time" in minutes. For example, in a case where "120" is set, as shown in the drawing, when a corresponding message has been unopened for 120 minutes since the message was registered, a corresponding agent is requested to confirm the message. Moreover, a user ID is identification information for uniquely identifying a user. In this case, a user ID is set as information for identifying an agent to be requested to confirm a corresponding message. In the drawing, "U1" is set as a user ID, so that an agent with a user ID "U1" is to be requested to confirm a corresponding message. Moreover, "CLOSE" is set as opened/unopened status. This means that a corresponding message is unopened. When the message is opened, opened/unopened status is replaced with "OPEN".

FIG. 4 is a view showing an example of template information stored in the template information storage unit 61. A user ID, a box ID, a name, and a template are in association with each other, as shown in the drawing.

A user ID is identification information for uniquely identifying a user, as mentioned previously. A box ID is identification information for uniquely identifying a message box. However, since every user does not necessarily have a message box, any box ID need not be registered for a user who has no message box. The name of a user who has a corresponding user ID is set as a name. A template is the characteristics of the voice of a user who has a corresponding user ID that are registered as reference data for authentication. In the drawing, although templates are indicated by simple symbols such as "T1", "T2", and "T3", a set of many parameter values may be set. Alternatively, a pointer to a storage area where such a set of parameter values are stored may be set.

FIG. 5 is a view showing an example of history information stored in the history information storage unit 62. An extension number is in association with box IDs, as shown in the drawing.

An extension number is assigned to a corresponding one of the telephones 10 connected to the PBX 30 via an extension line and is, for example, a number used as a telephone number in an organization such as an enterprise. Moreover, a box ID is identification information for uniquely identifying a message box, as mentioned previously. In this case, the box ID of a message box to which a message has been sent from one of the telephones 10 having a corresponding extension number before is set as a history. For example, in the drawing, it is shown that messages have been sent from one of the telephones 10 having an extension number "23" to message boxes having respective box IDs "12", "32", and "48" before. In many cases, old histories may be meaningless. Thus, histories before a certain point in the past may not be stored. In this case, for the sake of simplicity of management, it is assumed that the histories of ones of the telephones 10 connected to the PBX 30 via an extension line are stored. When the histories of ones of the telephones 10 connected to the PBX 30 via the public network 20 remain in, for example, the PBX 30, the histories may also be stored in a similar manner.

FIG. 6 is a view showing an example of such keyword information keyword information stored in the keyword information storage unit 63. A keyword is in association with box IDs, as shown in the drawing.

A phrase that may occur in conversations in which the telephones 10 are used is set as a keyword. Such a phrase is preferably that from which a user who has a conversation can be inferred from analogy to some extent. Moreover, a box ID is identification information for uniquely identifying a message box, as mentioned previously. In this case, the box ID of a message box of a user who is expected to have a conversation that includes a corresponding keyword is set.

For example, in the drawing, it is shown that users having respective message boxes with box IDs "12", "32", and "48" may use a keyword "XXX project" in conversations, and users having respective message boxes with box IDs "1", "5", "9", and "24" may use a keyword "sales section 1" in conversations.

Operations of an embodiment will be separately described. The operations of an embodiment include registering a message, requesting an agent to confirm an unopened message, and automatically updating a template used to authenticate an agent.

Figure 7:
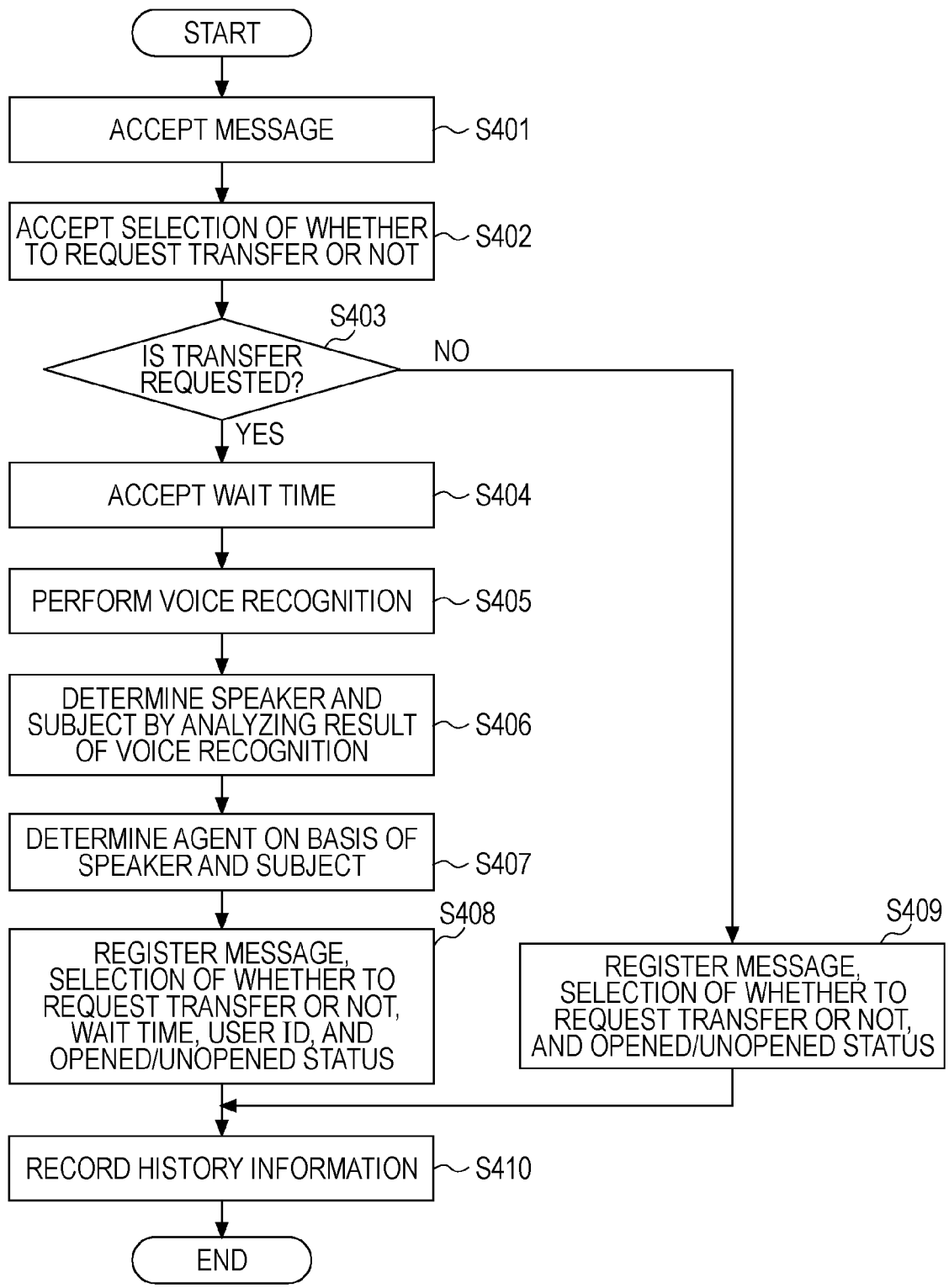
FIG. 7 is a flowchart showing an exemplary operation of registering a message in an embodiment of the present invention.

FIG. 7 is a flowchart showing an exemplary operation of the IVR 40 and the message management unit 50.

In the IVR 40, the voice response unit 41 first accepts a message (step 401). Specifically, the voice response unit 41 outputs a machine voice prompting for input of a message, and when a user speaks a message accordingly, the voice response unit 41 accepts the message. For example, when the user speaks a message "Today's meeting has been postponed to tomorrow.", the voice response unit 41 accepts the message. Then, the message is output to the DB management unit 55 in the message management unit 50 and the voice recognition unit 42.

Then, the voice response unit 41 accepts selection of whether to request transfer or not (step 402). Specifically, the voice response unit 41 outputs a machine voice prompting for input of selection of whether to request transfer or not, and when the user inputs selection of whether to request transfer or not by a dial operation accordingly, the voice response unit 41 accepts the input information. For example, the voice response unit 41 outputs a machine voice saying "In a case where a message is unopened, press "1" when transfer to a user-specified agent is desired or "2" when disconnection is desired", and when the user presses "1", the voice response unit 41 accepts information on the dial operation. Then, information on the selection of whether to request transfer or not is output to the DB management unit 55 in the message management unit 50.

Then, the voice response unit 41 determines whether information stating that transfer is requested has been input (step 403).

As a result, when the voice response unit 41 determines that information stating that transfer is requested has been input, the voice response unit 41 accepts wait time (step 404). Specifically, the voice response unit 41 outputs a machine voice prompting for input of wait time, and when the user inputs wait time by a dial operation accordingly, the voice response unit 41 accepts the input wait time. For example, the voice response unit 41 outputs a machine voice saying "Enter, in minutes, wait time until an agent is requested to perform confirmation in the case of unopened status", and when the user presses "1", "2", and "0", the voice response unit 41 accepts information on the dial operation. Then, the wait time is output to the DB management unit 55 in the message management unit 50.

Moreover, the voice recognition unit 42 performs voice recognition on the message received from the voice response unit 41 to convert the message to data (step 405). Then, the converted message is output to the DB management unit 55 in the message management unit 50.

In the message management unit 50, the DB management unit 55 transfers the input message to the language analysis unit 57. Then, the language analysis unit 57 determines the speaker and subject of the message by analyzing the data of the message that is the result of voice recognition (step 406).

Methods for determining the speaker and subject by analyzing the result of voice recognition include, for example, the following methods:

First, the method for determining the speaker can include a method in which phrases that are spoken before or after a speaker with a high probability are used as clues. For example, when a first phrase such as "of ○○ company" or "of ○○ section" occurs, a second phrase just before the first phrase is determined as being a speaker, and when a third phrase such as "hello" or "Thank you very much in advance for your kindness" occurs, a fourth phrase just before or after the third phrase is determined as being a speaker.

Next, the method for determining the subject can include a method in which keywords representing respective subjects are used as clues. For example, such keywords are registered in advance, and a subject represented by a keyword that occurs most frequently, out of the registered keywords, is determined to be a subject represented by a corresponding message.

Then, the determined speaker and subject are returned to the DB management unit 55. Then, the DB management unit 55 determines an agent (step 407). In this case, for example, the DB management unit 55 may determine, as being an agent, a user who has a preset user ID corresponding to the combination of the speaker and subject determined in step 406.

Subsequently, the DB management unit 55 stores, in the message storage unit 51, the message input from the voice response unit 41 in the IVR 40 in step 401, the information on the selection of whether to request transfer or not input from the voice response unit 41 in the IVR 40 in step 402, the wait time input from the voice response unit 41 in the IVR 40 in step 404, and the user ID of the agent determined in step 407, and the DB management unit 55 further sets the opened/unopened status to "CLOSE" (step 408). That is, the information as shown in FIG. 3 is registered in the message storage unit 51.

On the other hand, when it is determined in step 403 that information stating that transfer is not requested has been input, the voice response unit 41 transfers the information to the DB management unit 55 in the message management unit 50. Then, the DB management unit 55 stores, in the message storage unit 51, the message input from the voice response unit 41 in the IVR 40 in step 401 and the information on the selection of whether to request transfer or not input from the voice response unit 41 in the IVR 40 in step 402, and the DB management unit 55 further the opened/unopened status to "CLOSE" (step 409).

When registration of the message information in the message storage unit 51 is completed in this manner, information indicating the status is transferred to the voice print authentication unit 60 via the IVR 40. In the voice print authentication unit 60, the DB management unit 65 stores history information in the history information storage unit 62 (step 410). Specifically, the DB management unit 55 in the message management unit 50 transfers information to the voice response unit 41 in the IVR 40 stating that registration of the message information is completed, and the voice response unit 41 transfers the extension number of one of the telephones 10 that has sent the message and the box ID of a specified message box to the DB management unit 65 in the voice print authentication unit 60. Thus, the DB management unit 65 stores, in the history information storage unit 62, the box ID in association with the extension number.

In the aforementioned exemplary operation, in step 404, wait time that is time between registration of a message and submission of a request to confirm the message to an agent is accepted. However, what is acceptable is not limited to wait time. For example, confirmation request date and time (i.e., date and time when an agent is requested to perform confirmation) may be accepted.

Moreover, in the aforementioned exemplary operation, in step 406, a speaker is determined by analyzing the result of voice recognition. However, determining a speaker is not limited to this example. Before voice recognition is performed on a message, the speaker may be determined from other information. To implement this arrangement, a first method for determining a speaker on the basis of information on a device used by the speaker to register a message may be considered. For example, when a speaker uses a telephone to register a message, the speaker is determined from a telephone directory with the caller number being a key. Moreover, a second method for determining a speaker on the basis of the voice print of a voice when the speaker speaks a message may be considered. When a speaker can be determined by these methods, determination of the speaker by analyzing the result of voice recognition may not need to be performed.

Figure 8:
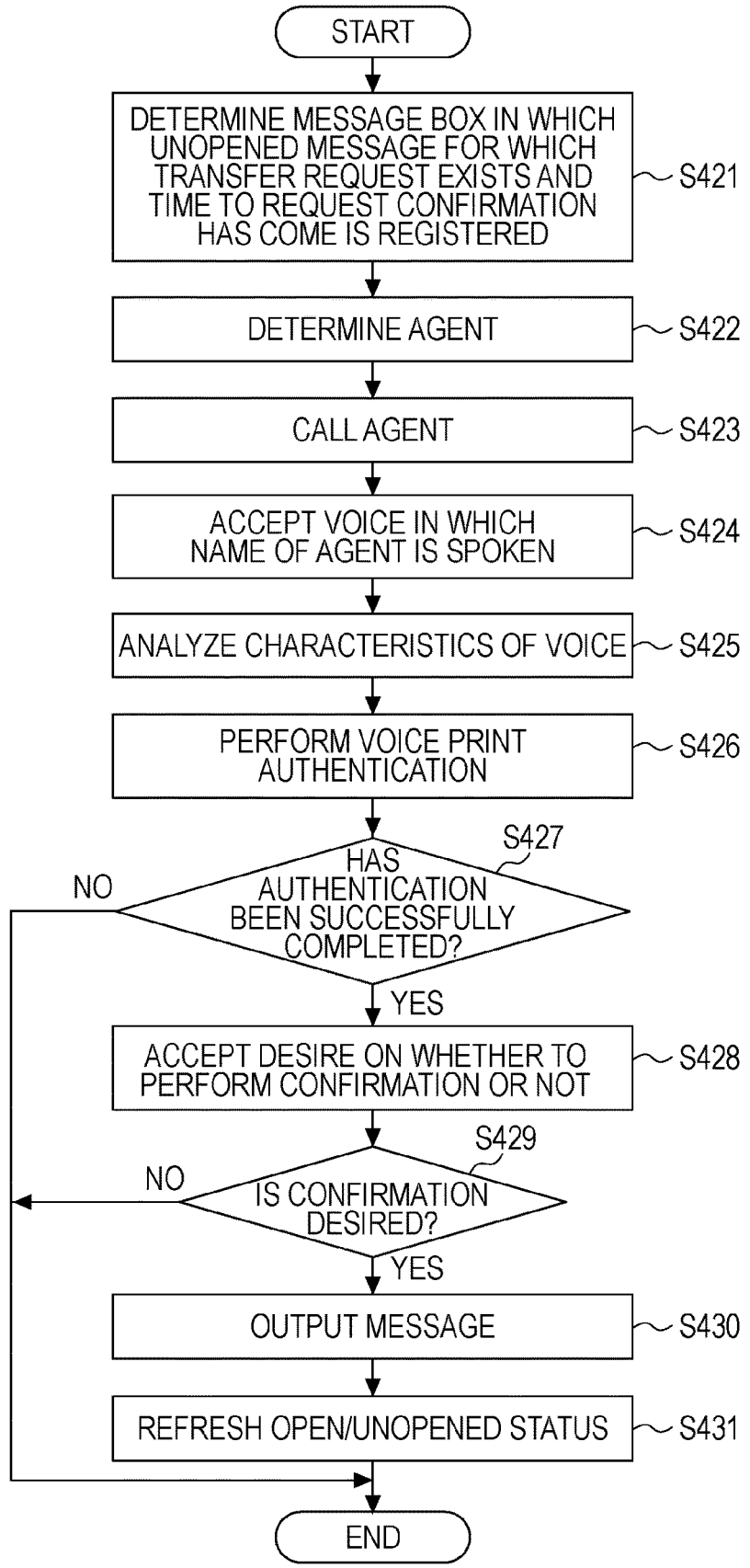
FIG. 8 is a flowchart showing an exemplary operation of requesting an agent to confirm an unopened message in an embodiment of the present invention.

FIG. 8 is a flowchart showing an exemplary operation of the IVR 40, the message management unit 50, and the voice print authentication unit 60.

In the message management unit 50, the DB management unit 55 first determines a message box in which an unopened message for which confirmation by an agent is requested and time to request confirmation has come is registered (step 421). Specifically, message information stored in the message storage unit 51 is periodically monitored, and it is determined whether any piece of message information exists in which a transfer request is "YES", whether the current time is later than time calculated by adding the wait time to time when the message was registered, and whether the open/unopened status is "CLOSE". When such a piece of message information exists, a box ID is retrieved from the piece of message information.

The DB management unit 55 further determines an agent from the piece of message information (step 422). Specifically, the DB management unit 55 retrieves the user ID of an agent.

Then, the DB management unit 55 indicates the user ID and a telephone number preset for the user ID to the dial out unit 43 in the IVR 40 and indicates to the dial out unit 43 to make a call at the telephone number (step 423). At this time, the dial out unit 43 indicates the user ID to the voice response unit 41.

Subsequently, the voice response unit 41 receives the name of the agent (step 424). Specifically, the voice response unit 41 outputs a machine voice prompting for input of a name, and when an agent speaks the name accordingly, the voice response unit 41 accepts a voice in which the name is spoken. For example, the voice response unit 41 outputs a machine voice saying "This is a request for confirmation in the capacity of an agent submitted because a message from ◯◯ is unopened. Please, record your name", and when the agent speaks "AAA", the voice response unit 41 accepts a voice in which "AAA" is spoken. Then, the voice, together with the user ID indicated by the dial out unit 43, is output to the DB management unit 65 in the voice print authentication unit 60.

Thus, in the voice print authentication unit 60, the DB management unit 65 transfers, to the voice analysis unit 66, the voice input from the IVR 40. Then, the voice analysis unit 66 analyzes the characteristics of the transferred voice (step 425). Then, the characteristics of the voice are output to the DB management unit 65.

Then, the DB management unit 65 performs voice print authentication on the voice of the agent (step 426). Specifically, the DB management unit 65 compares a template in association with the user ID input from the voice response unit 41 in the template information stored in the template information storage unit 61 with the characteristics of the voice input from the voice analysis unit 66.

Then, it is determined whether voice print authentication has been successfully completed (step 427). Specifically, it is determined whether the degree of similarity between the template in association with the user ID input from the voice response unit 41 in the template information stored in the template information storage unit 61 and the characteristics of the voice input from the voice analysis unit 66 exceeds a predetermined threshold value.

As a result, when it is determined that voice print authentication has been successfully completed, i.e., the degree of similarity exceeds the predetermined threshold value, the result is indicated to the voice response unit 41 in the IVR 40. Then, the voice response unit 41 accepts a request to confirm the message or not (step 428). Specifically, the voice response unit 41 outputs a machine voice indicating that voice print authentication has been successfully completed and prompting for input of a request to perform confirmation or not, and when the user inputs a request to perform confirmation or not by a dial operation accordingly, the voice response unit 41 accepts the input information. For example, the voice response unit 41 outputs a machine voice saying "Authentication has been successfully completed. Press "1" to confirm the message", and when the user presses "1", the voice response unit 41 accepts information on the dial operation. Then, the request to perform confirmation or not is output to the DB management unit 55 in the message management unit 50.

Thus, in the message management unit 50, the DB management unit 55 determines whether the agent desires to confirm the message (step 429).

As a result, when the DB management unit 55 determines that the agent desires to confirm the message, the DB management unit 55 retrieves the message registered in the message box determined in step 421 and transfers the message to the voice response unit 41 in the IVR 40. Then, the voice response unit 41 outputs the message (step 430). At this time, the DB management unit 55 changes the opened/unopened status corresponding to the retrieved message from "CLOSE" to "OPEN" in the message storage unit 51 (step 431).

On the other hand, when it is determined in step 427 that voice print authentication has not been successfully completed or when it is determined in step 429 that the agent does not desire to confirm the message, the DB management unit 55 completes the process without retrieving the message from the message box.

In an embodiment, a template used for such authentication of an agent is automatically updated while a user who is a possible agent has a conversation using one of the telephones 10.

Figure 9:
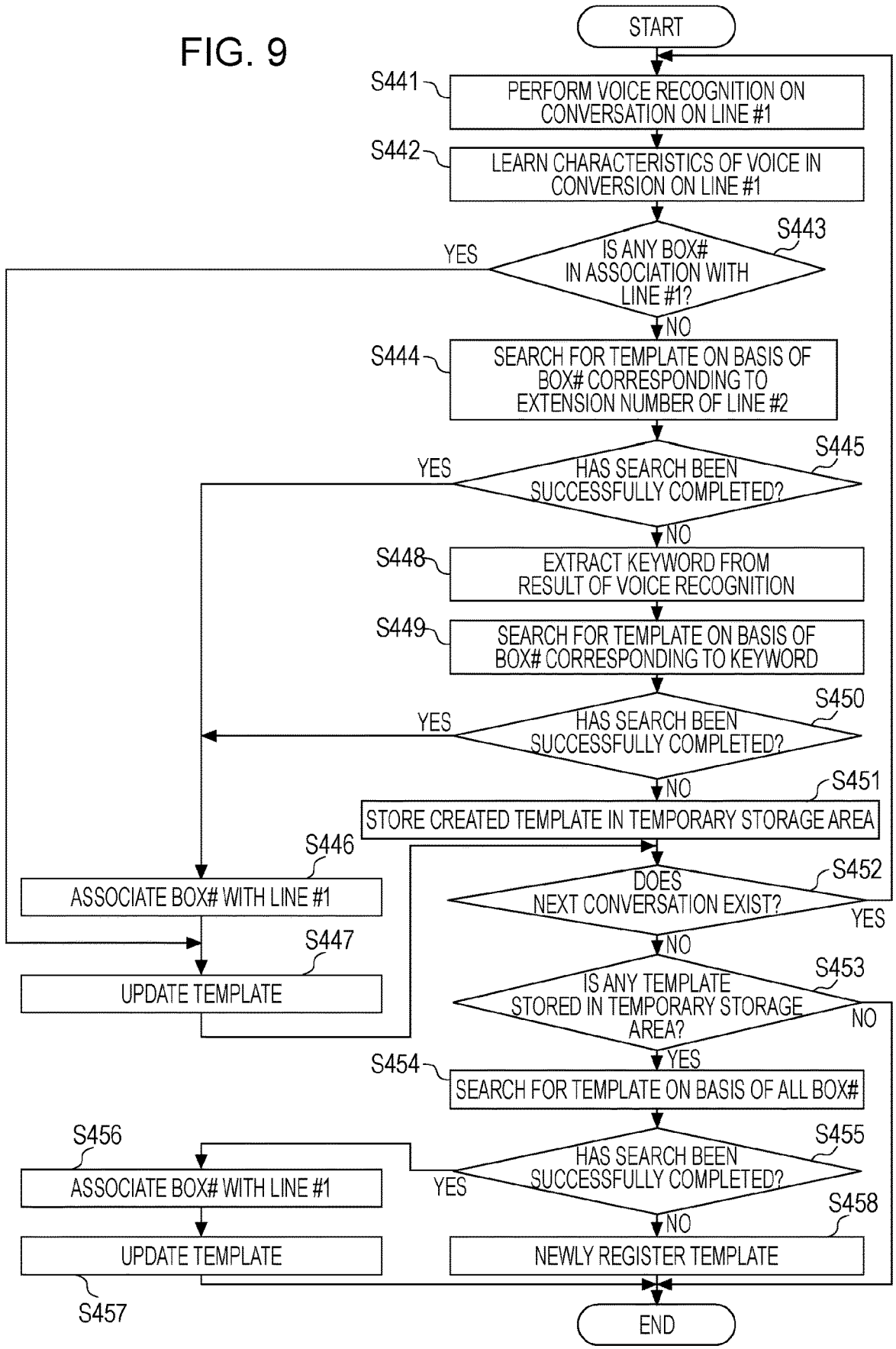
FIG. 9 is a flowchart showing an exemplary operation of automatically updating a template in an embodiment of the present invention.

FIG. 9 is a flowchart showing exemplary operations of the IVR 40 and the voice print authentication unit 60. It is assumed that, prior to the exemplary operations, conversation data is stored in the conversation storage unit 44 in the IVR 40 for each of the respective lines of the telephones 10.

For example, it is assumed that a user A and a user B have the following conversation using respective ones of the telephones 10. In this case, the user A is indicated by "A", and the user B is indicated by "B".

A: Is this Mr. B? This is sales representative A.
B: I haven't heard from you for a long time, Mr. A.
A: How is XXX project going?
B: It's going well. Shall I send you a document on XXX project that summarizes the recent status?
A: Would you please do so? Thank you very much in advance.
B: I understand.

When such a conversation is held, the conversation data of the user A: "Is this Mr. B? This is sales representative A.", "How is XXX project going?", and "Would you please do so? Thank you very much in advance." is stored in association with the line ID of the line of one of the telephones 10 used by the user A. Moreover, the conversation data of the user B: "I haven't heard from you for a long time, Mr. A.", "It's going well. Shall I send you a document on XXX project that summarizes the recent status?", and "I understand." is stored in association with the line ID of the line of one of the telephones 10 used by the user B.

In this state, in an embodiment, the template of the user A is automatically updated using the conversation data of the user A, and the template of the user B is automatically updated using the conversation data of the user B. However, processing in which the conversation data of the user A is used is similar to processing in which the conversation data of the user B is used. Thus, only processing in which the conversation data of one user is used will be described below. In this case, it is assumed that the line ID of a line in association with the conversation data of one user subjected to processing is a line #1, and the line ID of a line in association with the conversation data of a communication partner user who has a conversation with the one user is a line #2.

In the IVR 40, the voice recognition unit 42 first reads, from the conversation storage unit 44, as much conversation data as can be recognized by the voice recognition unit 42 (hereinafter called a conversation unit) out of the conversation data in association with the line #1, performs voice recognition on the conversation unit, and then outputs the result to the DB management unit 65 in the voice print authentication unit 60 (step 441).

The voice response unit 41 also reads, from the conversation storage unit 44, the same conversation unit as the voice recognition unit 42 reads and outputs the conversation unit to the DB management unit 65 in the voice print authentication unit 60. Then, the voice analysis unit 66 receives the conversation unit and learns the characteristics of the voice (step 442).

Then, the DB management unit 65 determines whether any box ID already associated with the line #1 exists (step 443). That is, in the following process, when a speaker is associated with a template, the DB management unit 65 stores information in which a line ID is in association with a box ID. Thus, the DB management unit 65 determines whether such information is stored.

At this time, when the first conversation unit is processed, no box ID is associated with the line #1. The operation at this time will be described.

In this case, the DB management unit 65 searches the template information storage unit 61 for a template, aiming at message boxes with respective box IDs in association with an extension number corresponding to the line #2 in the history information storage unit 62 (step 444). Specifically, the DB management unit 65 reads the respective box IDs of message boxes to which messages have been sent from the extension number corresponding to the line #2 before by searching the history information storage unit 62 on the basis of the extension number. Then, the DB management unit 65 determines templates corresponding to the box IDs, out of templates stored in the template information storage unit 61, as being templates to be searched, and searches, for a template to be updated, the templates to be searched. In this case, search of a template is performed by obtaining the distance or degree of similarity between the parameter values of each of the templates to be searched and the acoustic vectors of the voice obtained by analysis by the voice analysis unit 66, using, for example, the Dynamic Programming (DP) method, and selecting the template to be searched when the distance is equal to or more than a predetermined threshold value and reaches the maximum.

Then, the DB management unit 65 determines whether the search has been successfully completed (step 445). As a result, when the search has been successfully completed, the DB management unit 65 associates a box ID corresponding to the template found by the search with the line #1 (step 446). The DB management unit 65 further updates the template found by the search on the basis of parameter values in the acoustic vectors of the voice obtained by analysis by the voice analysis unit 66 (step 447). In this case, the updating of the template may include updating in which an existing template is replaced with the latest template created using parameter values obtained from the latest conversation unit or updating in which such the latest template is added to an existing template.

On the other hand, when the search has not been successfully completed, the DB management unit 65 transfers, to the language analysis unit 67, the result of the voice recognition input from the voice recognition unit 42 in the IVR 40. Then, the language analysis unit 67 extracts a keyword from the result of the voice recognition (step 448). Specifically, the language analysis unit 67 determines whether each of the keywords stored in the keyword information storage unit 63 occurs in the result of the voice recognition, and when the keyword occurs in the result of the voice recognition, the language analysis unit 67 extracts the keyword.

The DB management unit 65 further searches the template information storage unit 61 for a template, aiming at message boxes with respective box IDs in association with the keyword extracted by the language analysis unit 67 (step 449). Specifically, the DB management unit 65 reads the respective box IDs of message boxes owned by users related to the keyword extracted in step 448 by searching the keyword information storage unit 63 on the basis of the keyword. Then, the DB management unit 65 determines templates corresponding to the box IDs, out of the templates stored in the template information storage unit 61, as being templates to be searched and searches, for a template to be updated, the templates to be searched. In this case, search of a template is performed by obtaining the distance (degree of similarity) between the parameter values of each of the templates to be searched and the acoustic vectors of the voice obtained by analysis by the voice analysis unit 66, using, for example, the DP method, and selecting the template to be searched when the distance is greater than or equal to a predetermined threshold value and reaches the maximum.

Then, the DB management unit 65 determines whether the search has been successfully completed (step 450). As a result, when the search has been successfully completed, the DB management unit 65 associates a box ID corresponding to the template found by the search with the line #1 (step 446). The DB management unit 65 further updates the template found by the search on the basis of parameter values in the acoustic vectors of the voice obtained by analysis by the voice analysis unit 66 (step 447). In this case, the updating of the template may include updating in which an existing template is replaced with the latest template created using parameter values obtained from the latest conversation unit or updating such that the latest template is added to an existing template.

On the other hand, when the search has not been successfully completed, the DB management unit 65 stores, in a temporary storage area in the template information storage unit 61, a template created using the characteristics of the voice learned in step 442, for example, parameter values in acoustic vectors (step 451). For example, it is assumed that, in FIG. 4, the template of the user A is not registered. In this case, since the search fails in both step 445 and step 450, a template is stored in the temporary storage area shown in the bottom line in the drawing (indicated by "temp"). In this case, when the template stored in the temporary storage area is associated with a specific speaker in processing of the following conversation units, the template is removed from the temporary storage area.

Subsequently, the voice response unit 41 and the voice recognition unit 42 determine whether the next conversation unit is stored in the conversation storage unit 44 (step 452). In this case, when the next conversation unit is stored, steps 441 to 451 are repeated. That is, when a template is in association with the line #1 at this point, the template in association with the line #1 is updated in real time on the basis of real-time speech analysis of the following conversation units in the conversation data in association with the line #1 (step 447). Moreover, when no template is in association with the line #1 at this point, association of a template with the line #1 is reattempted using, for example, the history information stored in the history information storage unit 62 and the keyword information stored in the keyword information storage unit 63. On the other hand, in a case where it is determined in step 452 that the next conversation unit is not stored, when the template stored in the temporary storage area in step 451 remains intact, the process proceeds to processing of the template.

That is, the DB management unit 65 determines whether any template is stored in the temporary storage area (step 453). When no template is stored in the temporary storage area, the process is completed. In contrast, when a template is stored in the temporary storage area, the DB management unit 65 searches the template information storage unit 61 for a template, aiming at all message boxes with respective box IDs (step 454). Specifically, the DB management unit 65 determines all the templates stored in the template information storage unit 61 as being templates to be searched and searches, for a template to be updated, the templates to be searched. In this case, search of a template is performed by obtaining the distance (degree of similarity) between the parameter values of each of the templates to be searched and the acoustic vectors of the voice obtained by analysis by the voice analysis unit 66, using, for example, the DP method, and selecting the template to be searched when the distance is equal to or more than a predetermined threshold value and reaches the maximum.

Then, the DB management unit 65 determines whether the search has been successfully completed (step 455). As a result, when the search has been successfully completed, the DB management unit 65 associates a box ID corresponding to the template found by the search with the line #1 (step 456). The DB management unit 65 further updates the template found by the search on the basis of parameter values in the acoustic vectors of the voice obtained by analysis by the voice analysis unit 66 (step 457). In this case, the updating of the template may include updating in which an existing template is replaced with the latest template created using parameter values obtained from the latest conversation unit or updating in which such the latest template is added to an existing template.

On the other hand, when the search has not been successfully completed, the DB management unit 65 newly creates an entry in the template information storage unit 61 and registers the template stored in the temporary storage area in the entry (step 458).

In the aforementioned exemplary operation, a template is first searched for, referring to the history information storage unit 62, and if no template is found, a template is searched for, referring to the keyword information storage unit 63. However, the invention is not limited to this order. That is, a template may be first searched for, referring to the keyword information storage unit 63, and when no template is found, a template may be searched for, referring to the history information storage unit 62. Moreover, a template may be searched for, referring to only one of the history information storage unit 62 and the keyword information storage unit 63, or a template may be searched for, without referring to information in both the history information storage unit 62 and the keyword information storage unit 63.

In the embodiment described above the voice print authentication unit 60 is connected to the single IVR 40. Alternatively, the voice print authentication unit 60 may be connected to a plurality of IVRs 40, and the plurality of IVRs 40 may share the single voice print authentication unit 60. Alternatively, only the template information storage unit 61 may be shared by a plurality of voice print authentication units 60 as a shared personal information database.

Moreover, in an embodiment, the template information storage unit 61, the history information storage unit 62, and the keyword information storage unit 63 are provided separately. The template information storage unit 61 and the history information storage unit 62 may be constructed with a single table. The template information storage unit 61 and the keyword information storage unit 63 may be constructed with a single table. The template information storage unit 61, the history information storage unit 62, and the keyword information storage unit 63 may be constructed with a single table. For example, when the template information storage unit 61 and the history information storage unit 62 are constructed with a single table, the extension number of one of the telephones 10 from which a message has been sent to a message box with the box ID before may be set for each box ID in the template information storage unit 61. Moreover, when the template information storage unit 61 and the keyword information storage unit 63 are constructed with a single table, a keyword that may be used in a conversation by a user who has a message box with the box ID may be set for each box ID in the template information storage unit 61.

In an embodiment, language analysis may be performed on the result of performing voice recognition on a conversation in the background, and then a speaker may be dynamically registered on the basis of the result of the language analysis. That is, when a specified keyword occurs in a conversation, in the keyword information storage unit 63, a list of keywords can be updated without much time and labor by adding, for the keyword, a speaker who has spoken the keyword.

Moreover, words that frequently occur may be automatically set as keywords in the keyword information storage unit 63 by performing language analysis on the result of performing voice recognition on a conversation.

Moreover, in the above embodiment, an updated template is used in, although not limited to, authentication performed when a message addressed to another person is confirmed. An updated template may also be used in various cases where authentication of a speaker is necessary. For example, an action may be set for the voice print of each user, and thus, a function such as performing a specific action when a user who has a specific voice print has made a telephone call may be implemented. For example, a function such as sending a mail to the user A when the user A has left a message for the user B can be implemented by setting, for the voice print of the user A, an action for sending a mail to the user A.

In the above embodiment, a template is updated on the basis of a voice uttered by a speaker on a telephone, as described above. Thus, the more frequently telephones are used, the more the accuracy of extracting the voice print of each user is improved. In the embodiment, a template is updated using a voice message exchanged over the telephone. However, even when a voice message sent in a voice mail is used, a template can be updated in a similar manner.

Moreover, in an embodiment, a search scope when a template to be updated is searched for is narrowed using, for example, histories or keywords. This prevents a large number of templates in a database from being accessed, so that the speed of search can be improved.

Moreover, in an embodiment, a database in which speakers are in association with templates can be shared. Thus, all templates can be always updated from any of the telephones 10.

Figure 10:
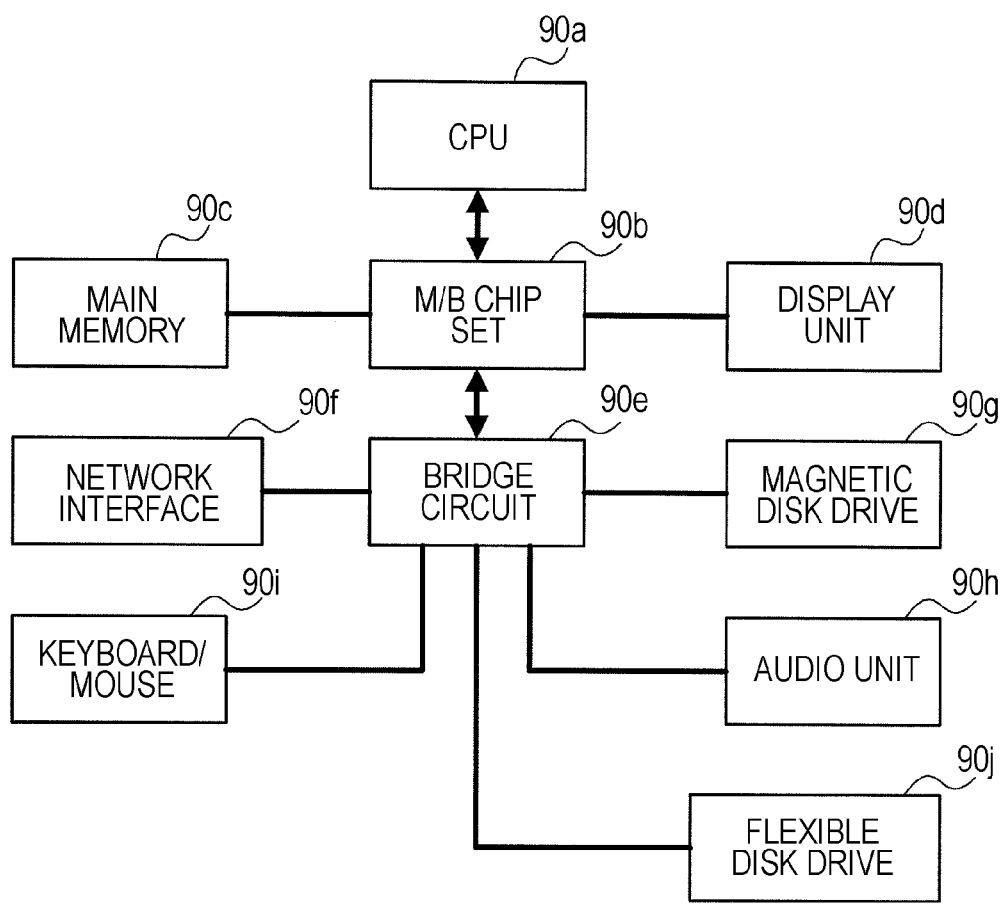
FIG. 10 is a diagram showing the hardware configuration of a computer to which an embodiment of the present invention can be applied.

Finally, the hardware configuration of a computer to which the embodiment is suitably applied will be described. FIG. 10 is a diagram showing an exemplary hardware configuration of such a computer. The computer includes a central processing unit (CPU) 90a, a main memory 90c connected to the CPU 90a via a mother board (M/B) chip set 90b, and a display unit 90d connected to the CPU 90a via the M/B chip set 90b, as shown in the drawing. Moreover, a network interface 90f, a magnetic disk drive (HDD) 90g, an audio unit 90h, a keyboard/mouse 90i, and a flexible disk drive 90j are connected to the M/B chip set 90b via a bridge circuit 90e.

In FIG. 10, the individual components are connected to each other via a bus. For example, connection between the CPU 90a and the M/B chip set 90b and connection between the M/B chip set 90b and the main memory 90c are established via a CPU bus. Moreover, connection between the M/B chip set 90b and the display unit 90d may be established via Accelerated Graphics Port (AGP). However, when the display unit 90d includes a video card that supports PCI Express, connection between the M/B chip set 90b and this video card is established via a PCI Express (PCIe) bus. Moreover, when connection to the bridge circuit 90e is established, regarding the network interface 90f, for example, PCI Express may be used. Moreover, regarding the magnetic disk drive 90g, for example, serial AT Attachment (ATA), ATA for parallel transfer, or Peripheral Components Interconnect (PCI) may be used. Moreover, regarding the keyboard/mouse 90i and the flexible disk drive 90j, Universal Serial Bus (USB) may be used.

The present invention may be implemented entirely via hardware, or entirely via software. Alternatively, the present invention may be implemented via both hardware and software. Moreover, the present invention may be implemented as a computer program product. This computer program product can be embodied on a computer-readable storage medium. In this case, an electronic, magnetic, optical, electromagnetic, infrared, or semiconductor system (apparatus or device) may be considered as the medium. Moreover, a semiconductor or solid-state storage unit, a magnetic tape, a detachable computer diskette, a random access memory (RAM), a read only memory (ROM), a rigid magnetic disk, and an optical disk can be shown as an example of a computer-readable storage medium. Examples of current optical disks include a compact disk-read only memory (CD-ROM), a compact disk-read/write (CD-R/W), and a DVD.

While the present invention has been described using the embodiment, the technical scope of the present invention is not limited to the aforementioned embodiment. It is obvious to persons skilled in the art that various changes can be made or an alternative embodiment can be adopted without departing from the spirit and scope of the present invention.

The invention claimed is:

1. A computer-implemented method for use with a telephone call answering system with improved caller recognition, comprising:
    receiving, from a caller through a communication network and by the telephone call answering system, message data including:
        (i) addressee data including information indicative of an addressee that is an intended recipient of the voice mail message, and
        (ii) voice data corresponding to audio content of a voice message;
    extracting, by the telephone answering system and from the audio content of the voice message, distinctive characteristics of the caller;
    selecting, by the telephone answering system, a plurality of candidate templates from a plurality of voice templates based, at least in part, upon a history of exchange of voice mail messages of the addressee;
    selecting, by the telephone answering system, a selected specific voice template based upon a degree of similarity between the extracted distinctive characteristics and distinctive characteristics indicated by the selected specific voice template; and
    updating, by the telephone answering system, the selected specific voice template based upon the extracted distinctive characteristics.

2. The method of claim 1, wherein
each of the plurality of candidate templates indicates distinctive characteristics uttered by a corresponding one of a plurality of speakers with which the addressee has exchanged voice messages.

3. The method of claim 1, wherein
the selecting the selected specific voice template is based upon the degree of similarity between the extracted distinctive characteristics and the distinctive characteristics indicated by the selected voice template exceeding a predetermined threshold value.

4. The method of claim 1, wherein
the plurality of candidate templates are selected, at least in part, based upon a keyword extracted from the voice message.

5. A telephone call answering system with improved caller recognition, comprising:
    at least one hardware processor configured to initiate and/or perform:
        receiving, from a caller through a communication network and by the telephone call answering system, message data including:

(i) addressee data including information indicative of an addressee that is an intended recipient of the voice mail message, and (ii) voice data corresponding to audio content of a voice message;

extracting, by the telephone answering system and from the audio content of the voice message, distinctive characteristics of the caller;

selecting, by the telephone answering system, a plurality of candidate templates from a plurality of voice templates based, at least in part, upon a history of exchange of voice mail messages of the addressee;

selecting, by the telephone answering system, a selected specific voice template based upon a degree of similarity between the extracted distinctive characteristics and distinctive characteristics indicated by the selected specific voice template; and updating, by the telephone answering system, the selected specific voice template based upon the extracted distinctive characteristics.

6. The system of claim 5, wherein
each of the plurality of candidate templates indicates distinctive characteristics uttered by a corresponding one of a plurality of speakers with which the addressee has exchanged voice messages.

7. The system of claim 5, wherein
the selecting the selected specific voice template is based upon the degree of similarity between the extracted distinctive characteristics and the distinctive characteristics indicated by the selected voice template exceeding a predetermined threshold value.

8. The system of claim 5, wherein
the plurality of candidate templates are selected, at least in part, based upon a keyword extracted from the voice message.

9. A computer program product for use with a telephone call answering system with improved caller recognition, the computer program product comprising:

a computer readable hardware storage device having stored therein computer readable program code, the computer readable program code, which when executed by the telephone answering system, causes the telephone answering system to perform:

receiving, from a caller through a communication network and by the telephone call answering system, message data including:

(i) addressee data including information indicative of an addressee that is an intended recipient of the voice mail message, and (ii) voice data corresponding to audio content of a voice message;

extracting, by the telephone answering system and from the audio content of the voice message, distinctive characteristics of the caller;

selecting, by the telephone answering system, a plurality of candidate templates from a plurality of voice templates based, at least in part, upon a history of exchange of voice mail messages of the addressee;

selecting, by the telephone answering system, a selected specific voice template based upon a degree of similarity between the extracted distinctive characteristics and distinctive characteristics indicated by the selected specific voice template; and updating, by the telephone answering system, the selected specific voice template based upon the extracted distinctive characteristics.

10. The computer program product of claim 9, wherein
each of the plurality of candidate templates indicates distinctive characteristics uttered by a corresponding one of a plurality of speakers with which the addressee has exchanged voice messages.

11. The computer program product of claim 9, wherein
the selecting the selected specific voice template is based upon the degree of similarity between the extracted distinctive characteristics and the distinctive characteristics indicated by the selected voice template exceeding a predetermined threshold value.

12. The computer program product of claim 9, wherein
the plurality of candidate templates are selected, at least in part, based upon a keyword extracted from the voice message.

* * * * *